Patented Jan. 26, 1937

2,069,060

UNITED STATES PATENT OFFICE 2,069,060

ALKALI-FREE CERAMIC MATERIALS AND METHOD OF MAKING SAME

Albra H. Fessler, Flint, Mich., assignor to General Motors Corporation, Detroit, Mich., a corporation of Delaware No Drawing. Application December 14, 1935, Serial No. 54,428

8 Claims. (Cl. 23—142)

This is a continuation in part of my prior application Serial No. 729,345, filed June 6, 1934.

This invention has to do with a method of producing ceramic material, especially non-plastics, of very low alkali content as well as with the resulting products.

In certain commercial uses of ceramic materials it is very desirable that the alkali content be as low as possible. Thus in the manufacture of high grade spark plug porcelains the presence of alkalies is objectionable because they have the effect of reducing the hot dielectric strength of the insulator. In the case of ceramic supports and spacers for the emitting and heating elements of vacuum tubes, the presence of alkalies is also seriously objectionable as they tend to volatilize, raising the gas pressure in the tube, producing undesirable space charge effects and shortening the life of the electrodes through positive ion bombardment.

By the process herein disclosed it is possible to produce at low cost ceramic materials of extremely low alkali content.

In general the process consists in adding boric oxide ($B_2O_3$) to the raw material and heat treating it, as by fusing or calcining, for a sufficient length of time to drive off both the boric acid and the major portion of the alkaline impurities. Analyses of the resulting product indicate entire elimination of the boric oxide and the reduction of alkalies to a very small amount, at times a mere trace.

I have successfully applied the process to a number of non-plastics including alumina, mullite, magnesia, zircon and titanium oxide, all of these materials having possible use in the manufacture of spark plug insulators. In each case I have preferably first determined the amount of alkali present in the material and have then added an amount of boric acid sufficient to remove it. Thus in cases where the predominant alkali is soda, boric acid has been added in the molecular ratio of $4B_2O_3$ to $1Na_2O$, or 280 units by weight of boric acid to 62 units by weight of $Na_2O$.

The non-plastic, mixed with boric oxide, usually added as boric acid, is then heat treated either by fusion in the electric furnace or by calcination at lower temperatures, e. g., on the order of 1400° C. Where the material is fused it is not necessary to thoroughly mix the raw materials but in the case of calcination the powdered ingredients should be thoroughly mixed to promote the action.

In the case of mullite I have employed fusion in the electric furnace and have continued treatment until the analysis indicates complete absence of boric acid and reduction of alkalies to a trace.

In the case of zircon and titanium oxide I have employed calcination with the same results in reduction of alkali.

In the case of magnesium oxide I have employed both calcination and fusion with satisfactory results.

The utility of the method in the treatment of various non-plastics including silicon carbide, corundum, etc., is indicated.

An especially important application of my method is in the manufacture of alumina. By my method alumina may be cheaply produced having an alkali content lower than the variety now designated as C. P.

A method heretofore commonly employed in the manufacture of alumina of low alkali content is as follows: Bauxite, ($Al_2O_3 2H_2O$) is heated with sodium carbonate ($Na_2CO_3$), producing sodium aluminate $NaAlO_2$ or $Na_2O$, $Al_2O_3$. Water is passed through the resulting mass, resulting in the production of a solution of sodium aluminate, and leaving a residue of finely divided oxide of iron. From the solution aluminum hydroxide $Al(OH)_3$ or $Al_2O_3$, $3H_2O$ is precipitated by the action of carbon dioxide at 50–60°:

$$2NaAlO_2 + CO_2 + 3H_2O = Na_2CO_3 + 2Al(OH)_3.$$

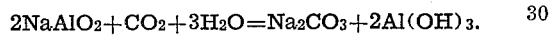

The precipitate is filter pressed and washed with water to remove most of the sodium carbonate. Thereafter in order to further reduce the alkali content the filter press cake is washed four or five times with acid. The resulting purified aluminum hydroxide is then calcined at around 1,000° C., which drives off most of the water, leaving aluminum oxide. Such specially treated material regularly contains as much as .3% alkali content, compared with .6% in the case of standard alumina, and .13% in the case of C. P. alumina.

In carrying out the present invention the above described process is followed down to the point of washing the filter press cake with acid. This step is eliminated. Instead, the aluminum hydroxide is dry mixed with boric oxide ($H_3BO_3$) just before it is introduced into the rotary kiln for calcination. The amount of boric oxide required is determined by the alkali content. Thus for every 62 units by weight of $Na_2O$ in the material treated 280 units by weight of $B_2O_3$ should be used. This is in the molecular ratio of $1Na_2O$ to $4B_2O_3$. While the principal effect of the boric oxide is to remove soda, it is believed that it also effects a reduction of the alkalies in general.

While the usual calcination temperature is about 1,000° C., as previously stated, and at this temperature some of the soda is volatilized, for effective removal of the soda, calcination temperatures in the neighborhood of 1300° C. are required. However, the higher temperature alone without the addition of boric acid will not accomplish the removal of the soda although higher calcination temperature does affect the total acid soluble, but this in turn does not affect the total alkali content. In other words, the higher calcination temperature does change the low-temperature form of alumina, which is known as gamma, to the high temperature form of alpha, but this change does not promote the loss of soda during calcination.

Alumina purified by boric oxide treatment is found to contain a total alkali content as low as .08% and at times as low as .05%. The purified product costs no more, if as much, to produce as the acid washed alumina with its .30% alkali content, for the repeated washing with acid is eliminated and is replaced with the simple dry mixing of aluminum hydrate with boric oxide combined with calcination at slightly higher temperatures. By the new process the possibility of contamination of the alumina by the action of acid on the washing equipment is, of course, eliminated. A sample of the new, purified alumina, analyzed in our laboratories showed the total alkali content to be .08%, acid-soluble alkali .04% and the total acid soluble content .26%.

It is to be expected that many other uses will be found for the purified products.

I claim:

1. The method of producing ceramic materials substantially free of alkali which consists in adding boric acid to ceramic material containing alkaline impurities and heat treating the material to an extent to volatilize the boric acid and with it the major portion of the alkali.

2. The method of producing ceramic materials substantially free of alkali which consists in determining the amount of alkali present in the material, adding thereto boric acid in the molecular ratio required to completely reduce the alkali, and heat treating the resulting mixture until the boric acid is volatilized together with the major portion of the alkali.

3. The method of making alumina of low alkali content which consists in mixing aluminum hydroxide containing alkaline impurities with boric acid and calcining the mixture at temperatures below the temperature of fusion and continuing such calcination until the alkaline impurities are volatilized along with the boric acid.

4. The method of making alumina of low alkali content which consists in mixing aluminum hydroxide with boric acid in substantially the proportion of at least four molecules of boric oxide to one molecule of alkali present as an impurity, and calcining the mixture at a temperature on the order of 1300° C.

5. The method of making alumina of low alkali content which comprises the step of mixing aluminum hydroxide containing alkaline impurities with boric acid and calcining it at temperatures in the neighborhood of 1300° C. and continuing such calcination until the alkaline impurities are volatilized along with the boric acid.

6. The method of making alumina of low alkali content which consists in heating bauxite with sodium carbonate, passing water through the resulting mass, subjecting the consequent solution to the action of carbon dioxide, mixing the resultant precipitate with boric acid and calcining the mixture to volatilize the alkali content.

7. The method of making alumina of low alkali content which consists in heating bauxite with sodium carbonate producing sodium aluminate, passing water through the resulting mass producing a solution of sodium aluminate, subjecting the solution to the action of carbon dioxide thereby precipitating aluminum hydroxide, mixing the aluminum hydroxide with boric acid and calcining the mixture to volatilize the alkali content.

8. In the method of making alumina as defined in claim 7, the calcination being carried out at temperatures in the neighborhood of 1300° C.

ALBRA H. FESSLER.